Figure 1:
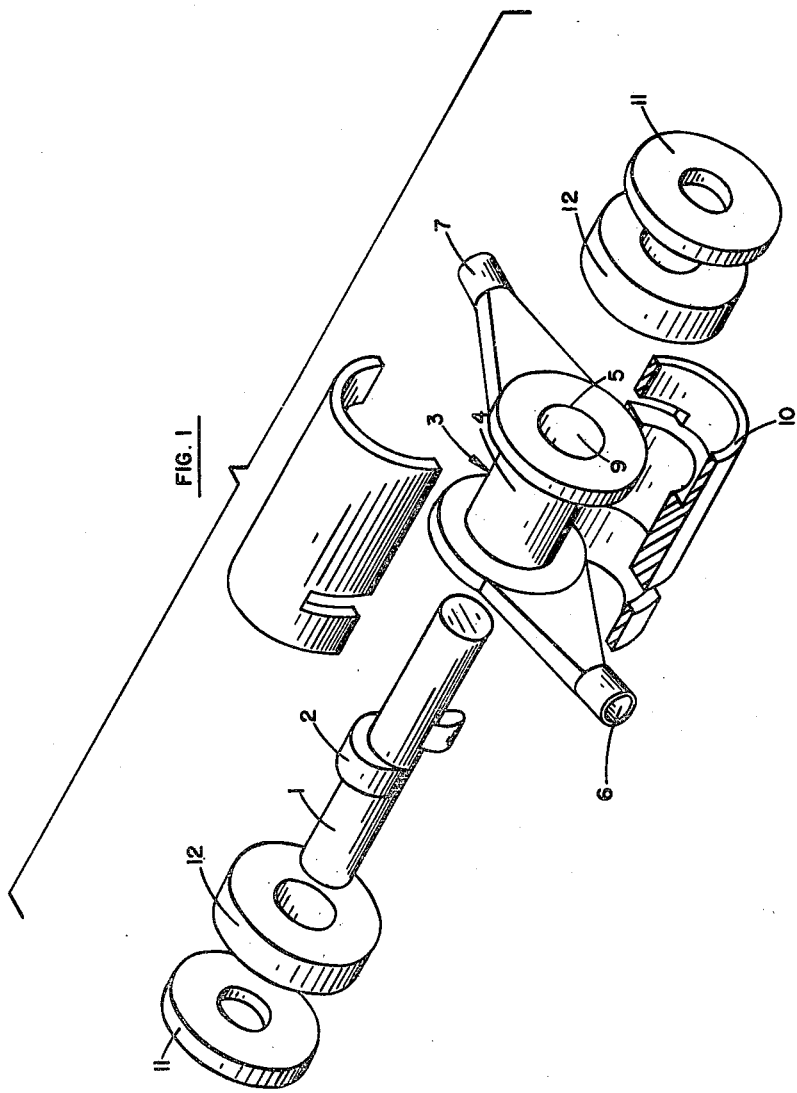

June 14, 1960 R. S. BAKER 2,940,393
SPIRAL ROTOR ELECTROMAGNETIC PUMP
Filed June 17, 1958 2 Sheets-Sheet 1

INVENTOR.
RICHARD S. BAKER

BY *Gerald G. Koris*

ATTORNEY

June 14, 1960     R. S. BAKER     2,940,393
SPIRAL ROTOR ELECTROMAGNETIC PUMP

Filed June 17, 1958     2 Sheets-Sheet 2

INVENTOR.
RICHARD S. BAKER

BY *Gerald A. Koris*

ATTORNEY 2,940,393

SPIRAL ROTOR ELECTROMAGNETIC PUMP

Richard S. Baker, Northridge, Calif., assignor to North American Aviation, Inc.

Filed June 17, 1958, Ser. No. 742,690

6 Claims. (Cl. 103—1)

This invention relates to an improved electromagnetic pump for pumping electrically conducting metals such as sodium.

The pumps that have been available for pumping electrically conducting liquids include centrifugal pumps, bellows pumps, and electromagnetic induction and conduction pumps. Disadvantages of centrifugal and bellows pumps are that shaft seals and corrosion resistant materials must be provided. In the conduction, or Faraday-type, electromagnetic pump, a current from an external source is caused to flow in the liquid metal, which is confined in a magnetic field. Pumps of this type using both alternating and direct current have been built. The disadvantages of the conduction electromagnetic pumps include the difficulty of fabricating a brazed or welded joint between the copper bus bars which are an essential part of this pump and the stainless steel pumping section. Furthermore, the bus bars may drop off due to the diffusion of copper into the stainless steel at the very high temperatures such pumps operate, for instance 1000° F. and above. On the other hand, if the bus bars are made of materials with better metallurgical properties, the efficiency will frequently be less than one percent for sizes above 10 gallons per minute. The induction and conduction pumps have the common disadvantage that the windings must be in close proximity to the pumping section carrying the molten metal. The winding insulation and the conductors of such pumps are both adversely affected by the high temperatures, and in the case of sodium-cooled nuclear reactors by the radioactivity, of the molten metal. Furthermore, the linear induction electromagnetic pumps, in which pumping action is imparted by movement of the magnetic field along the linear pumping section, requires a very complex polyphase electrical energizing system. Although such pumps are quite efficient, they are also very expensive.

An object of my invention, therefore, is to provide an improved electromagnetic pump for pumping electrically conducting liquids.

Another object is to provide an electromagnetic pump which eliminates the polyphase and expensive core windings of prior linear induction pumps.

Another object is to provide a simplified, induction-type electromagnetic pump of high efficiency.

Another object is to provide a linear induction electromagnetic pump with a simple field structure which can be energized by direct current.

Still another object is to provide such a pump which causes pumping action by varying the magnetic flux in the pumping section by mechanical rotation.

Other objects and advantages of my invention will become apparent from the following detailed description, taken together with the accompanying drawings and the appended claims.

Figure 2:
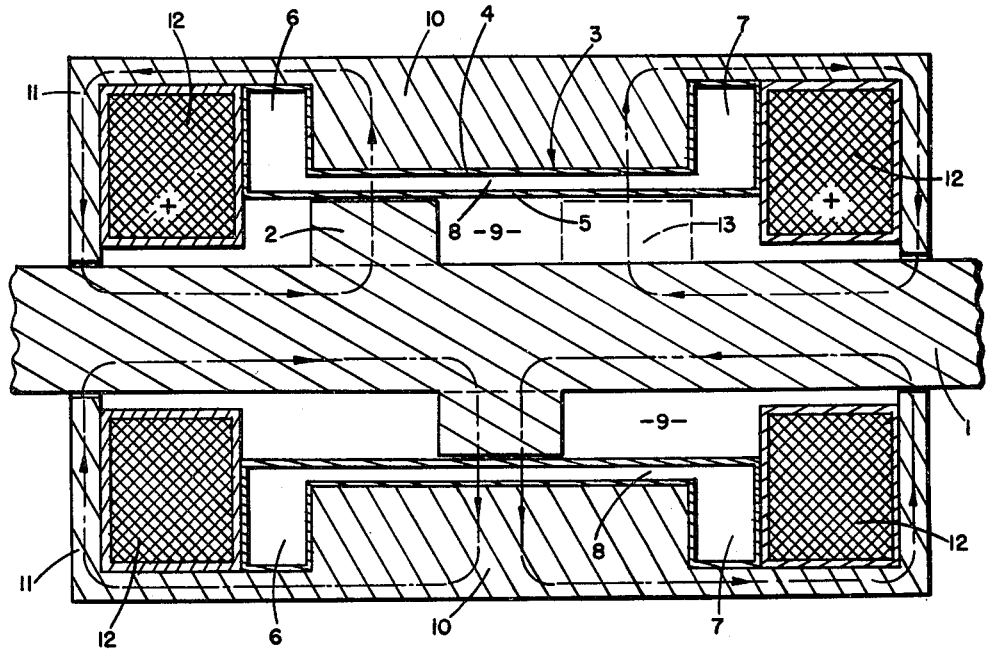
Figure 3:
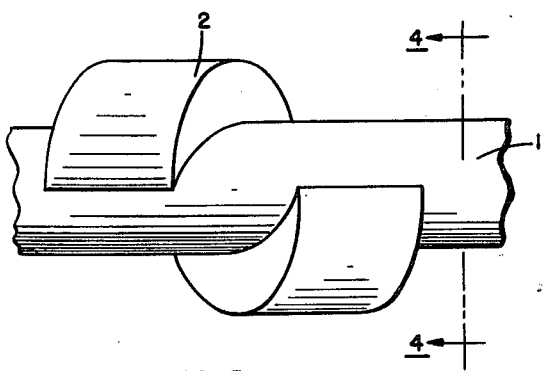
Figure 4:
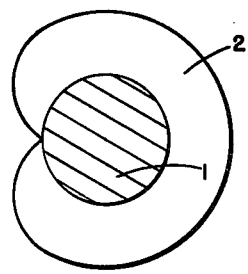

In the drawings, Fig. 1 is an exploded view of my pump, Fig. 2 is a longitudinal section, partly schematic, Fig. 3 an enlarged portion of Fig. 1, and Fig. 4 a section through Fig. 3.

Considering now Figs. 1 and 2 together, a shaft or rotor 1 of good magnetic material (not permanent magnetic) such as silicon steel is provided. This shaft is driven by an external prime mover, not shown. Upon shaft 1 a lobe 2 is provided, cut in the shape of one half turn of a helix, as seen in Figs. 3 and 4. The helix is rectangular in cross section, as seen in Fig. 2. Threads cut to other pitches and angles may also be used and the one design shown is not critical; for example, a complete turn of a helix may be used or the threads may be cut into the shaft itself. However, the pitch of the thread and the width of the thread in a direction parallel to the axis of rotation should preferably permit a separation between adjacent traces of thread on the same side of the shaft in a plane in which the axis of the shaft lies. The purposes of this screw or spiral rotor is to provide a variance in the magnetic flux and thus provide pumping action. The screw is of such length as to travel in rotation approximately the length of the pumping section of the pump. Thus, the simple spiral rotor will achieve the same effect as the immensely more complicated and expensive polyphase windings of the prior art linear induction pump, by varying the magnetic flux in the pumping section.

The pumping section 3 comprises two hollow concentric cylinders 4 and 5, and has at one end an inlet chamber, port or volute 6 for the molten metal and at the other end an oppositely directed outlet chamber or port 7. Sodium flows through a hollow, partitionless annulus 8 defined by the walls of cylinders 4 and 5. The spiral rotor is positioned in the central channel 9 in the inner hollow cylinder 5. Thus the spiral rotor does not actually come in contact with the molten metal and shaft seals or other containing means need not be provided at the point of entrance in the inner cylinder 5. The rotor may be held by bearings, not shown, external to the pump, for instance, by cushion block bearings, as well as by bearings integral to the pump. A field structure 10, which provides a flux return path, completely encloses the pump and serves as its own pump casing. Field structure 10 has end pieces 11 which could also be fabricated in one piece with the body of the field structure. The field structure is welded together about pumping section 3. The field structure 10 is fabricated from a good grade of magnetic material (non-permanent magnetic) such as silicon steel, while the pumping section 3 is composed of a corrosion resistant metal of not strongly magnetic properties, to avoid undue shunting of magnetic flux. Examples of satisfactory pumping section materials are Inconel, titanium and stainless steel, stainless steel being preferred, especially the 300 series for sodium service.

An electromagnetic core 12, consisting of coils of wire, stationary with respect to the field structure are provided. These coils may also be fixed to the shaft if dictated by the necessity for removal and replacement for repair purposes, in an environment where it is not possible to perform maintenance work at the pump. Alternatively, the coils may be replaced by permanent magnets having the same geometry, magnetized so that the surface next the shaft 1 has one magnetic polarity and the surface next the field structure has the opposite polarity. The direction of magnetization in the annulus 8 is everywhere perpendicular to the center line of the shaft.

In operation of the pump, direct current is supplied to the coils from an external source (not shown). Each coil carries current and produces magnetic fluxes following directions shown by the arrows in Fig. 2. The resultant magnetic flux passes through shaft 1, the molten metal in annular pumping section 8 and returns to the shaft. When the shaft is rotated by the external prime mover, the magnetic field in the pumping section and the currents induced in the liquid by the change of magnetic flux are similarly changed. The thread 13 of the helix shown in phantom in Fig. 2 indicates the position of the thread at the completion of one revolution. The magnetic field in the pumping section travels from inlet port 6 to outlet port 7 inducing eddy currents in the molten metal in annulus 8. The interaction between the magnetic field and the current induced in the liquid by the change in the magnetic flux, resulting from rotation of the spiral rotor, causes movement of the liquid metal into and out of the pump.

My pump will develop a pressure of 40 p.s.i. with a flow of 2000 gallons per minute of sodium, when the shaft is driven at 500 r.p.m. with a direct current input to the coils of 20 amperes total at 120 volts. The shaft may be driven by a standard 3 phase induction motor. A variable speed drive is unnecessary, because the pressure is controlled by a rheostat in series with the direct current supply to the coils.

While the above description presents a single embodiment of my invention, it is obvious that the principle of the invention, that of the spiral rotor shaft to impart a traveling wave in a linear induction electromagnetic pump, may be used in pumps with varying design features. For example, in place of energized coil windings, permanent magnets may be used; the shaft may have a lobe cut at various pitches; the ports and pumping section may be of different physical configuration; and other construction details such as rotor bearings may also vary. Therefore, my invention should be limited only as is indicated by the appended claims.

I claim:

1. An improved electromagnetic pump for electrically conducting liquids which comprises a pair of spaced walls defining an annular pumping section, an inlet port and an outlet port connected to said pumping section, a rotor having an external screw thread adapted to rotate inside the inner said walls adjacent said annular pumping section, magnet means positioned adjacent said walls adapted to produce a magnetic field across said annular pumping section, the rotation of said rotor changing the magnetic flux across said annular pumping section, inducing interaction between the induced current in the conducting liquid and the magnetic field to impart pumping action.

2. An improved electromagnetic pump for electrically conducting liquids which comprises a pair of concentric hollow cylinders defining an annular pumping section, an inlet port connected to one end said annular pumping section, an outlet port connected to the other end said annular pumping section, a rotor having an external screw thread positioned in the inner said cylinders, said thread being positioned adjacent said annular pumping section, annular magnet means positioned adjacent said walls adapted to produce a magnetic field across said annular pumping section, the rotation of said rotor changing the magnetic flux across said annular pumping section, causing interaction between the induced current in the conducting liquid and the magnetic field to impart pumping action.

3. An improved electromagnetic pump for electrically conducting liquids which comprises a pair of spaced walls defining a partitionless, annular pumping section, an inlet port and an outlet port connected to said annular pumping section, a rotor containing an external screw thread positioned in the inner said wall, said thread being positioned opposite said annular pumping section, an annular magnetic core positioned adjacent said pumping section, and a field structure enclosing said pumping section and said magnetic core, the rotation of said rotor changing the magnetic flux across said annular pumping section so as to impart a traveling magnetic wave between said inlet and outlet ports and thereby induce pumping action.

4. The pump of claim 3 wherein said spiral rotor comprises a shaft containing a helical lobe thereon.

5. An improved electromagnetic pump for electrically conducting liquids which comprises a pair of concentric cylinders defining a partitionless, annular pumping section, an inlet port at one end of said annular pumping section and an outlet port at the other end, a rotor being positioned centrally in the inner said cylinders, said rotor having a lobe with a screw thread cut therein, said lobe being positioned opposite said annular pumping section, annular electromagnetic cores disposed about the axial ends said pumping section, and a field structure pump casing enclosing said pumping section and said cores, the rotation of said rotor changing the magnetic flux across said annular pumping section so as to impart a traveling magnetic wave between said inlet and outlet ports and thereby induce pumping action.

6. The pump of claim 5 wherein said lobe on said rotor is cut to one half turn of a helical thread.

References Cited in the file of this patent

UNITED STATES PATENTS

| | | |
|---|---|---|
| 2,663,809 | Winslow | Dec. 22, 1953 |
| 2,716,943 | Vandenberg | Sept. 6, 1955 |
| 2,786,416 | Fenemore | Mar. 26, 1957 |
| 2,811,107 | Brill | Oct. 29, 1957 |
| 2,847,936 | Richter | Aug. 19, 1958 |